United States Patent [19]

Kutnyak et al.

[11] 4,427,485
[45] Jan. 24, 1984

[54] ULTRASONICALLY BONDED HELICALLY FABRICATED TUBING AND APPARATUS AND METHOD FOR MAKING SAME

[75] Inventors: Thomas A. Kutnyak, Greenwood; Donald L. Johnson, Abbeville, both of S.C.

[73] Assignee: Automation Industries, Inc., Greenwich, Conn.

[21] Appl. No.: 377,380

[22] Filed: May 12, 1982

[51] Int. Cl.³ .............................................. B32B 31/00
[52] U.S. Cl. ..................................... 156/429; 156/143; 156/195; 156/73.1; 156/580.1; 156/580.2
[58] Field of Search ............................. 156/73.1–73.4, 156/580.1, 580.2, 195, 143

[56] References Cited

U.S. PATENT DOCUMENTS

| | | | |
|---|---|---|---|
| 2,633,894 | 4/1953 | Caraile | 156/73.1 X |
| 3,312,250 | 4/1967 | Sirignano | 156/73.2 X |
| 3,660,186 | 5/1972 | Sager et al. | 156/73.2 |
| 3,950,213 | 4/1976 | Rejeski et al. | 156/144 X |
| 4,214,612 | 7/1980 | Putter | 156/73.2 X |

FOREIGN PATENT DOCUMENTS 2443916 12/1978 France ........................... 156/195

Primary Examiner—David A. Simmons
Attorney, Agent, or Firm—Francis N. Carten

[57] ABSTRACT

Flexible tubing formed of a wire helix wrapped helically with plastic tape having overlapping turns fused directly together ultrasonically, with no extraneous adhesive, and with knurling imprinted on the tubing interior, and apparatus and a method for making such tubing wherein a rotating cantilevered mandrel has a knurled anvil band over which overlapping edges of the tape pass to receive fusing vibrations from an adjacent ultrasonic horn.

4 Claims, 6 Drawing Figures

ULTRASONICALLY BONDED HELICALLY FABRICATED TUBING AND APPARATUS AND METHOD FOR MAKING SAME

BACKGROUND OF THE INVENTION

Ultrasonic technology has been applied to the fabrication of wire-reinforced plastic-wrapped tubing by a process wherein overlapped plies of a plastic wrapping are passed between a stationary anvil surface and an ultrasonic horn and fused together. Fusion is characteristically carried out over wide overlapping areas comprising as much as ninety percent of the tubing surface area. As fusion is taking place and the plastic is softened by heat and vulnerable to damage it is passed in sliding contact over a stationary anvil surface, and hence measures have to be taken to safeguard against tearing or stretching of the plastic. Among these are the use of particularly plastic films of more than one mil and slow production speeds of fifteen feet per minute of tubing or less. The resulting prior art product typically has a rather stiff-multi-ply wall of greater than 2.5 mil thickness.

The background of this invention also includes current practices for making air conditioning ducts, products to which the ultrasonic methods embodied herein are particularly suitable. Typical prior art air conditioning tubing consists of plastic tape wrapped with overlapping turns about plastic-coated steel wire and covered by thermal insulation and an outer moisture barrier. The plastic tape may be a continuous plastic film, and the above described conventional ultrasonic method has been used to make such a product. In other cases to improve sound deadening acoustical properties the continuous plastic film may be replaced by woven scrim fabric coated with plastic with overlapping turns joined by adhesive, all of which adds considerably to the cost of the product.

Finally, the background of the present invention includes well known apparatus and methods for making wire-reinforced flexible hose, such as those described in U.S. Pat. Nos. 2,486,387, 2,759,521, 3,219,733 and 3,336,172. It is known from that prior art to make tubing on a plurality of rotatable mandrels cantilevered from a frame with semi-circular wire-receiving grooves formed about the mandrels and spaced apart longitudinally depending upon the pitch desired in the wire helix. However, ultrasonic sealing has not previously been adapted to such tube-making concepts.

SUMMARY OF INVENTION

The invention provides ultrasonic apparatus for continuously forming flexible tubing including at least one wire helix of a certain pitch covered by helically wrapped plastic tape. The apparatus includes a frame and at least two rotatable mandrels cantilevered from the frame about respective parallel axes arranged equidistant from the center line of the tubing to be formed thereon. Drive means are provided on the frame for positively rotating at least one of the mandrels about its axis. Wire receiving circumferential grooves are formed about the respective mandrels and spaced apart longitudinally from one mandrel to the next a distance determined by the pitch of the helix to be formed. The apparatus further includes tape-feeding means for drawing the tape helically about the mandrels with edge portions of the tape overlapping and wire-feeding means for applying the wire about the mandrels within the grooves so that the wire helix is formed and covered by the tape. One of the mandrels has at least one circumferential anvil band located relative to its circumferential groove so as to be beneath the overlapping tape edges drawn over that mandrel. At least one ultrasonic horn is located adjacent to and is directed at the rotating anvil band. Transducer means are included for activating the ultrasonic horn to fuse the overlapping tape edges together. In a preferred form of the apparatus the anvil band includes a knurled surface.

The invention also provides a method of continuously forming flexible tubing including at least one wire helix of a certain pitch covered by helically wrapped plastic tape. The method comprises axially rotating at least two cantilevered parallel mandrel surfaces each formed with wire receiving circumferential grooves spaced apart longitudinally from one mandrel to the next a distance determined by the pitch of the helix to be formed, and one of which mandrels is also formed with at least one circumferential anvil band. The method further provides for continuously feeding tape about the mandrels with the edges of the tape overlapping over the anvil band, and continuously applying the wire helically about the mandrels within the grooves so that a wire helix is formed and covered by the tape. Ultrasonic vibrations are directed continuously against the overlapping tape edges as they pass over the rotating anvil so as to fuse the overlapping edges together. In its preferred form the method further includes the step of concentrating the ultrasonic vibrations against knurling on the anvil thereby imprinting knurling on the tubing interior where the tape edges are fused together.

In addition the invention provides a flexible tubing product which includes at least one wire helix covered by helically wrapped plastic tape. In this product overlapping edges of the tape are fused directly together with no extraneous adhesive material therebetween. Knurling is imprinted on the interior of the tubing in a helical band along the fused overlapping edges of the tape.

DESCRIPTION OF PREFERRED EMBODIMENT

Figure 1:
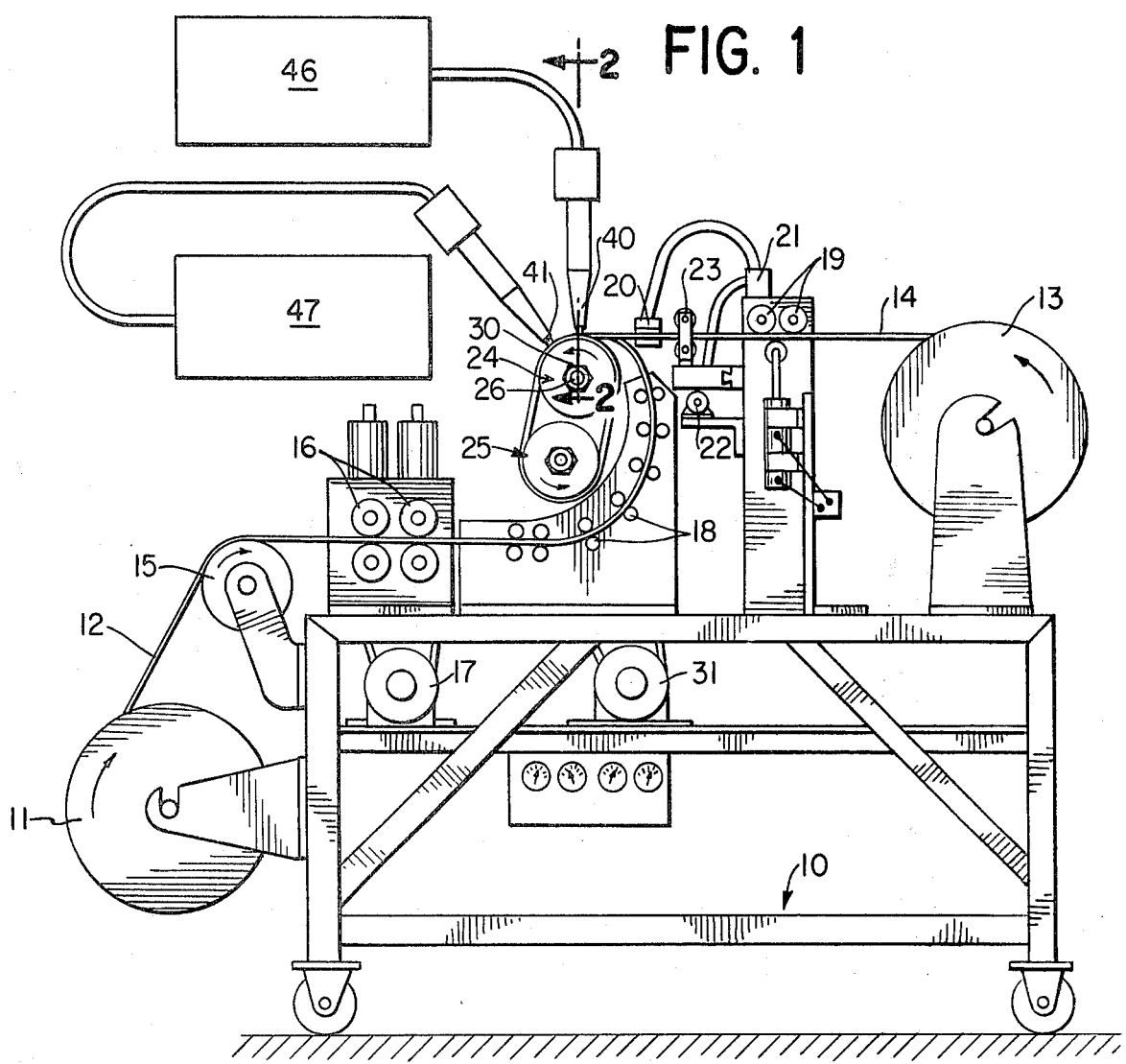
FIG. 1 is a partly schematic end elevation of the apparatus of the invention.

Referring now particularly to FIG. 1 the apparatus of the invention includes a frame 10 on which is mounted a spool 11 containing an indefinite length of wire 12. The wire 12 may typically be a carbon steel round wire having a coating of vinyl or other thermoplastic material or it may be a galvanized wire for corrosion resistance. It should in any event be resilient and possess good elastic memory.

Another spool 13 is also mounted on the frame 10 and it contains an indefinite length of plastic tape 14. If an impervious tube lining resistant to high pressure is desired in the finished product the tape 14 may be a film of nylon or polyester perhaps 0.5 to 1 mil in thickness. If better acoustical properties are desired in the final product the tape may be of non-woven spun-bonded fabric of nylon, polyester, propylene, polyethylene, modified acrylic or polyvinylchloride. Such a non-woven structure comprises multiple fibers randomly laminated or bonded together to form a porous paperlike material. In any case the material chosen for the tape 14 must be capable of fusing to itself when subjected to ultrasonic vibrations.

The wire 12 passes over a guide pulley 15 and through drive wheels 16 driven by drive means 17 to a helix-forming array of tolls 18, all of which is conventional in the art. Likewise the tape 14 passes through tension-control rollers 19 and a photocell control switch 20 which can actuate the solenoid 21 to operate air cylinders 22 which in turn causes a web guide control 23 to move sideways and realign the tape 14 if it moves out of predetermined limits of lateral alignment. Servo systems of this sort are also in general use in apparatus for making helically fabricated tubing.

Figure 4:
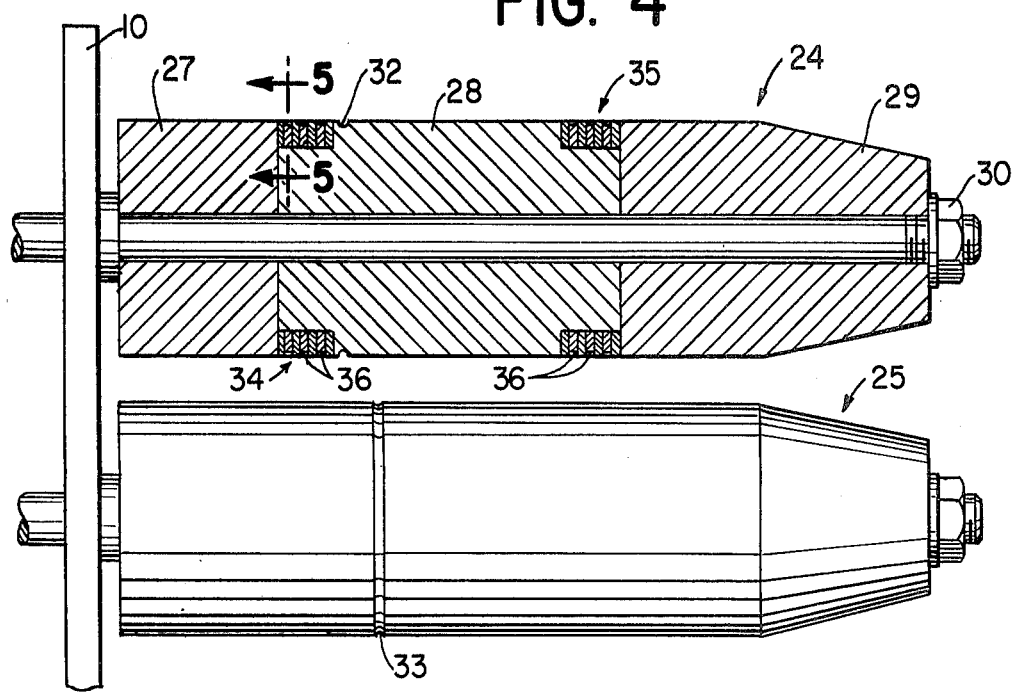
FIG. 4 is an enlarged fragmentary view partly in section showing the two mandrels of the apparatus.

Referring now to FIG. 4 as well as FIG. 1, a pair of axially rotatable mandrels 24 and 25 are cantilevered from the frame 10 about respective parallel axes arranged equidistant from the centerline of the tubing to be formed thereon. It is within the scope of the invention to have more than two such mandrels, in which event they would be grouped equidistant about the centerline of the tubing to be formed. The mandrel 24 includes a central axle 26 holding together a base portion 27 a central portion 28 and a tapered nose portion 29, all by means of a threaded nut 30 on the outer end of the axle 26. Drive means 31 shown in FIG. 1 are provided for positivily rotating the upper mandrel 24 while the lower mandrel 25 idles, though it is within the scope of the invention to drive both of the mandrels.

The central portion of the mandrel 24 includes a circumferential groove 32 and the central portion of the mandrel 25 includes a similar groove 33. The grooves 32 and 33 are spaced apart longitudinally half the pitch of the helix to be formed in the finished product and their cross section is semi-circular of slightly greater diameter than that of the wire 12.

Figure 2:
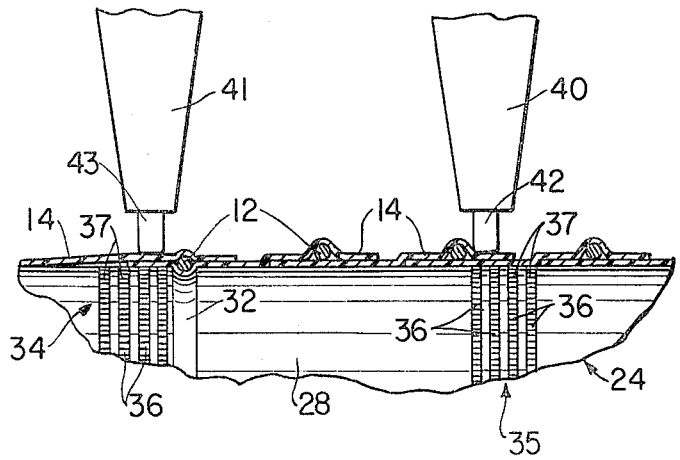
FIG. 2 is an enlarged fragmentary elevation partly in section showing a form of the apparatus wherein two spaced ultrasonic horns are employed, the section being taken generally along the line 2—2 of FIG. 1 except that for clarity both of the horns have been shown in the same plane.
Figure 5:
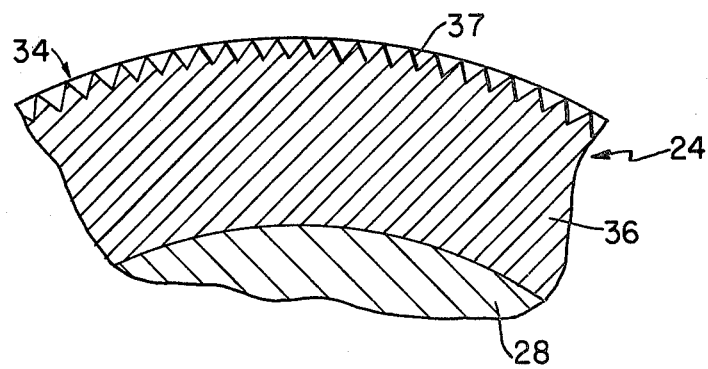
FIG. 5 is an enlarged fragmentary section taken along the line 5—5 of FIG. 4 showing the knurled anvil in detail.

Referring to both FIG. 2 and FIG. 4 the central portion 28 of the mandrel 24 includes a first anvil band 34 and a second anvil band 35, each of which comprises a plurality of longitudinally spaced rings 36 inset into the mandrel and having outer annular knurled surfaces 37 (see FIG. 5) co-planar with the mandrel surface. The knurled rings 36 may be spaced apart by plain rings which are not knurled. In the alternate mandrel embodiment of FIG. 3 a single anvil band 38 wider than either of the anvil bands 34 or 35 is provided for reasons described hereinafter.

Adjacent to and directed at each of the anvil bands 34 and 35 in the embodiment of FIGS. 1, 2 and 4 are respective ultrasonic horns 40 and 41. These horns are shown for simplicity in FIG. 2 as being side-by-side but as suggested in FIG. 1 the horn 41 would be in a different plane than the horn 40 for better access to the mandrel 24. The horn 40 has a sealing blade 42 and the horn 41 has a sealing blade 43 as illustrated in FIG. 2, whereas in the embodiment of FIG. 3 a single ultrasonic horn is provided with a pair of sealing blades 44. In either embodiment there is a single generator-transducer for each horn, so that in the embodiment of FIGS. 1 and 2 the horn 40 is provided with generator and transducer means 46 and the horn 41 is provided with similar generator and transducer means 47. Each generator-transducer and horn assembly is controlled individually for power requirements and applied pressure to the tape according to known principles in ultrasonic technology. The paired horns of FIGS. 1 and 2 can more than double the sealing speed of a larger single horn as in FIG. 3, attaining sealing rates up to seven-hundred and fifty linear feet per minute.

In the operation of the apparatus, the tape 14 is drawn about the central portion 28 of the mandrel 24 in a helical fashion. The wire 12 formed into a helix between forming rolls 18 is drawn over one edge of the tape 14 and also over and within a portion first of the semi-circular groove 32 and then of the groove 33 in a manner known to the tube making art. Upon actuation of the drives 17 and 31 the wire 12 is pulled from its spool 11 and wrapped continuously in successive convolutions with the tape 14 so as to be enclosed within overlapping edge portions of the tape 14 as shown most clearly in FIG. 2. The single horn embodiment of FIG. 3 produces a wire helix enclosed within overlapping edges of tape in precisely the same manner. The composite of wire and tape is somewhat oval in cross-section while still on the mandrels as shown in FIG. 1 but when it emerges from the mandrels the elastic memory of the wire causes it to return to a circular cross section. At a subsequent station in the process not shown in the drawings a circumferentially complete layer of fiberglass insulation 49 is applied about the tape and a moisture barrier 50 of polyethylene or metalized plastic is disposed about the insulation.

Figure 3:
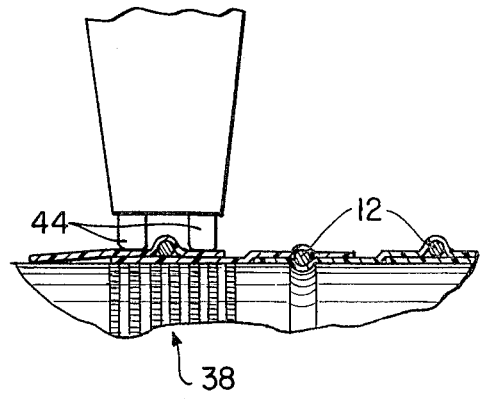
FIG. 3 is an enlarged fragmentary elevation partly in section showing an embodiment of the apparatus similar to that of FIG. 2 except that it includes only a single ultrasonic horn.
Figure 6:
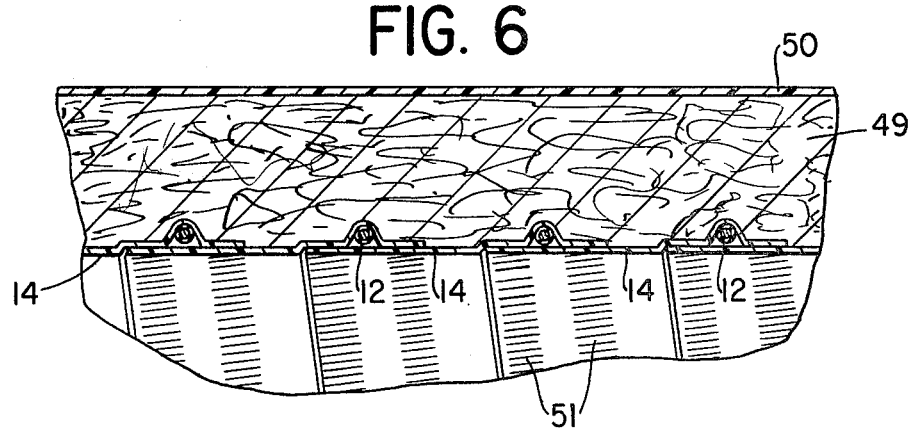
FIG. 6 is an enlarged longitudinal fragmentary section of the wall of flexible tubing made in accordance with the invention made on the apparatus shown in FIGS. 1 through 5.

Returning to the embodiment shown in FIG. 2 it will be seen that the ultrasonic horns 40 and 41 and their respective blades 42 and 43 are disposed adjacent the anvil bands 34 and 35. Thermal effects caused by ultrasonic vibrations fuse and seal the overlapping edges of the tape 14 with no extraneous adhesive material in between. The knurling 37 on the anvil bands can increase running speeds by as much as twenty percent because it concentrates the energy at the peaks of the raised knurls. The knurling also kneads and melds the softened plastic together and imparts a corresponding knurled pattern 51 on the interior of the tubing as shown in FIG. 6. It will be readily apparent that in the embodiment of FIG. 2 the horn 40 fuses the overlap of the tape 14 just ahead of the wire 12 while the horn 41 thereafter fuses the overlap of the tape 14 just behind the wire 12. In the embodiment of FIG. 3 on the other hand the single more highly powered anvil has two blades 44 which simultaneously fuse the overlap of the tape both ahead and behind the enclosed wire, and hence the anvil band 38 in the embodiment in FIG. 3 is somewhat wider than those of FIG. 2 to accomodate the double-bladed horn.

FIG. 6 can be taken as illustrative of the product made by either the double horn embodiment of FIG. 2 or the single horn embodiment of FIG. 3, the only difference being that the two anvil bands 34 and 35 of FIG.

2 leave the tube interior without a knurled imprint immediately under the wire 12 as shown in FIG. 6 whereas the single anvil band 38 of FIG. 3 imprints a knurled pattern across the wire. Because the anvil bands opposite the ultrasonic horns rotate with the plastic tape there is no dragging of the soft plastic over a stationary anvil surface and hence thinner film may be used for the tape without causing damage. From that it is possible to make a thinner wall product which is less than half the weight of prior art ultrasonically bonded helically fabricated tubing but still sufficiently strong, pliable and smooth on the interior for optimum air flow.

It is to be noted that the form of the invention illustrated in FIG. 2 wherein two horns are employed, each with a single blade, may involve individual generator-transducers 46 and 47 of either 20 or 40 kHz frequency. Likewise in the embodiment of FIG. 3 wherein a single horn with double blades is employed the single generator-transducer used therewith may have a frequency either 20 or 40 kHz. A special booster may be employed to optimize the energy flux delivered between transducers.

The scope of the invention is set forth in the following claims rather than foregoing description of preferred forms of the apparatus, method and product.

We claim:

1. Ultrasonic apparatus for continuously forming flexible tubing including at least one wire helix of a certain pitch covered by helically wrapped plastic tape comprising:
   (a) a frame,
   (b) at least two rotatable mandrels cantilevered from said frame about respective parallel axes arranged equidistant from the centerline of the tubing to be formed thereon,
   (c) drive means on said frame for positively rotating at least one of said mandrels about its axis,
   (d) wire-receiving circumferential grooves formed about the respective mandrels and spaced apart longitudinally from one mandrel to the next a distance determined by the pitch of the helix to be formed,
   (e) tape-feeding means for drawing said tape helically about said mandrels with edge portions of the tape overlapping,
   (f) wire-feeding means for applying said wire about said mandrels within said grooves so that the wire helix is formed and covered by said tape,
   (g) one of said mandrels having at least one circumferential anvil band located relative to its circumferential groove so as to be beneath the overlapping tape edges drawn over that mandrel,
   (h) said anvil band including a plurality of longitudinally spaced rings inset into the mandrel and having an outer annular knurled surface co-planar with the mandrel surface,
   (i) at least one ultrasonic horn adjacent to and directed at the rotating anvil band, and
   (j) transducer means for activating the ultrasonic horn to fuse the overlapping tape edges together.

2. Ultrasonic apparatus according to claim 1 wherein the tape and wire-feeding means supply the wire between the overlapping tape edges, and a single ultrasonic horn includes a pair of sealing blades which simultaneously seal the overlapping tape edges to each side of the wire, and a pair of anvil bands are located on the driven mandrel adjacent the respective horns.

3. Ultrasonic apparatus according to claim 1 wherein the tape and wire-feeding means apply the wire between the overlapping tape edges, and two ultrasonic horns each with a single sealing blade successively seal the overlapping tape edges to each side of the wire, and a pair of anvil bands are located on the driven mandrel adjacent the respective horns.

4. Ultrasonic apparatus according to claim 1 which includes means for continuously applying about the tape wrapped wire a circumferentially complete layer of thermal insulating material with an outer moisture barrier.

* * * * *